United States Patent
Schneider

(10) Patent No.: US 9,366,874 B2
(45) Date of Patent: Jun. 14, 2016

(54) BEAM COMBINING AND DEFLECTING DEVICE WITH ONE OR MORE RISLEY PRISM PAIRS DEFLECTING AN INPUT BEAM IN AN ADJUSTABLE DIRECTION

(75) Inventor: Marco Schneider, Neuried (DE)

(73) Assignee: TOPTICA Photonics AG, Graefelfing (DE)

( * ) Notice: Subject to any disclaimer, the term of this patent is extended or adjusted under 35 U.S.C. 154(b) by 381 days.

(21) Appl. No.: 13/810,339

(22) PCT Filed: Jul. 15, 2011

(86) PCT No.: PCT/EP2011/003544
§ 371 (c)(1),
(2), (4) Date: Feb. 7, 2013

(87) PCT Pub. No.: WO2012/007174
PCT Pub. Date: Jan. 19, 2012

(65) Prior Publication Data
US 2013/0140429 A1    Jun. 6, 2013

(30) Foreign Application Priority Data

Jul. 16, 2010  (DE) .......................... 10 2010 027 540
Oct. 29, 2010  (DE) .......................... 10 2010 049 771

(51) Int. Cl.
*G02B 27/10*      (2006.01)
*G02B 27/14*      (2006.01)
(Continued)

(52) U.S. Cl.
CPC . *G02B 27/10* (2013.01); *G01J 1/44* (2013.01); *G02B 26/0883* (2013.01); *G02B 27/108* (2013.01); *G02B 27/145* (2013.01)

(58) Field of Classification Search
CPC .... G02B 5/045; G02B 5/0278; G02B 27/145; G02B 6/0053; G02B 27/283; G02B 27/149; G02B 5/04
USPC .............. 250/216, 214.1, 201.1, 235, 236; 359/211.1, 211.2, 209.1; 372/23, 34, 372/36
See application file for complete search history.

(56) References Cited

U.S. PATENT DOCUMENTS 4,950,056 A *  8/1990  Smith ............................ 359/366
7,193,353 B2   3/2007  Miyazawa
(Continued)

FOREIGN PATENT DOCUMENTS

DE   10 2004 015 638    12/2004
DE   10 2010 031 674    4/2011
(Continued)

OTHER PUBLICATIONS

International Search Report of PCT/EP2011/003544, Feb. 24, 2012.

*Primary Examiner* — Que T Le
(74) *Attorney, Agent, or Firm* — Collard & Roe, P.C.

(57) ABSTRACT

A beam combining device includes a plurality of separate input beam paths and an output beam path for combining a plurality of input beams to an output beam. One or a plurality of Risley prism pairs are assigned to each input beam path of the beam combining device. The prism pairs deflect the input beam in an adjustable direction. A device for deflecting a light beam includes a Risley prism pair that includes two prisms arranged one behind the other in the light beam path. At least one of the two prisms is mounted in a rotatable manner. An electromotive drive brings about a rotary movement of the rotatable prism. The electromotive drive is a piezoelectric vibration drive having a mechanical resonator and a piezoelectric element coupled thereto. The resonator bears against a friction wheel connected to the rotatable prism.

7 Claims, 3 Drawing Sheets

Figure 1:
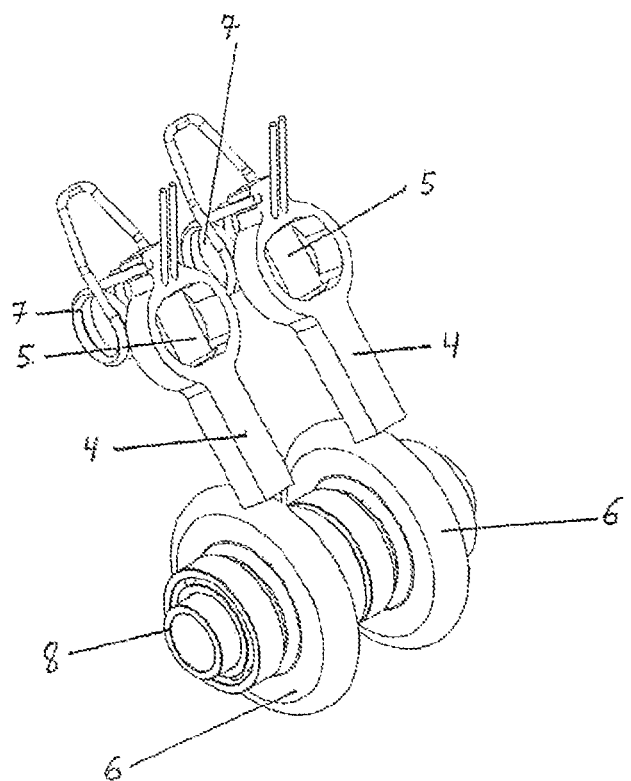

(51) Int. Cl.
*G01J 1/44* (2006.01)
*G02B 26/08* (2006.01)

(56) References Cited

U.S. PATENT DOCUMENTS

| | | | |
|---|---|---|---|
| 8,254,735 | B2 | 8/2012 | Tsai |
| 2003/0138193 | A1 | 7/2003 | Sweatt et al. |
| 2003/0147142 | A1 | 8/2003 | Biswas et al. |
| 2009/0323203 | A1 | 12/2009 | Adams et al. |
| 2011/0134949 | A1 | 6/2011 | O'Shaughnessy et al. |

FOREIGN PATENT DOCUMENTS

| | | |
|---|---|---|
| EP | 1 176 741 | 1/2002 |
| WO | WO 93/22765 | 11/1993 |
| WO | WO 01/29833 | 4/2001 |
| WO | WO 01/57568 | 8/2001 |

\* cited by examiner

BEAM COMBINING AND DEFLECTING DEVICE WITH ONE OR MORE RISLEY PRISM PAIRS DEFLECTING AN INPUT BEAM IN AN ADJUSTABLE DIRECTION

CROSS REFERENCE TO RELATED APPLICATIONS

This application is the National Stage of PCT/EP2011/003544 filed on Jul. 15, 2011, which claims priority under 35 U.S.C. §119 of German Application No. 10 2010 027 540.9 filed on Jul. 16, 2010 and under 35 U.S.C. §119 of German Application No. 10 2010 049 771.1 filed on Oct. 29, 2010, the disclosures of which are incorporated by reference. The international application under PCT article 21(2) was not published in English.

The invention relates to a beam combining device comprising a plurality of separate input beam paths and at least one output beam path for combining a plurality of input beams to at least one output beam.

Devices of this type are required in order, for example, to combine, i.e. to superimpose, the beams from a plurality of lasers each having a different radiation spectrum to form a single beam. Hitherto utilized for this purpose are extensive optical arrays comprising a plurality of optical and mechanical elements, for example tilting deflector mirrors. If the laser beams to be combined and also the output beam combined are to propagate in optical fibers, fiber optics or fiber couplers are furthermore required which substantially increase the expenditure on adjustments on the one hand and which on the other hand cause quite substantial radiation losses.

A well-aimed deflection of free beams in state-of-the-art technology is accomplished by deflector mirrors which are adjustable by the aid of stepper motors. To allow for an adjustment in three dimensions, large-volume, complex and comparably expensive devices are required.

It is an object of the invention to provide a compact and cost-effective beam combining device which reliably provides for a precise and stable superimposition of the input beams in the output beam.

In order to achieve this object, the invention proposes that one or a plurality of Risley prism pairs are assigned to each input beam path of the beam combining device, said prism pairs deflecting the input beam in an adjustable direction.

Risley prism pairs are comprised of two Risley prisms which when rotated against each other cause a deflection of the transmitted beam. The beam steering property of the Risley prism pairs is hitherto merely utilized for optical switches or for a directed light radiation.

US 2003/10138193 A1 discloses an optical switch comprising Risley prisms in which arrays of input and output fibers stand opposite to each other, with one Risley prism pair each being assigned to each input and output fiber, said prism pair making it possible to switch light from an input fiber to a certain output fiber.

US 2009/0323203 A1 discloses a device for optical beam steering in which a Risley prism pair steers a laser beam in a desired direction. An array of a plurality of such devices, for example, enables a parallel radiation of several laser beams in a selectable direction.

The invention utilizes the Risley prism pairs in such a manner that a beam exiting from the laser source, e.g. a laser, hits consecutively on one or a plurality of Risley prism pairs which steer it selectively to a deflecting device for coupling it into an output beam path in such a manner that the different input beams precisely overlap spatially in the relevant output beam and propagate jointly.

When using more than one Risley prism pair, the desired deflection can be intensified or a major malposition of the beam can be better offset. In particular, a parallel misalignment of the relevant input beam can be flexibly compensated.

Apart from the Risley prism pair, the input beam path may contain further optical elements. Depending on the beam source or the transport medium of the input beam, e.g. a laser diode or an optical fiber, it may be advantageous to implement additional optical elements, e.g. filters, collimators, lenses, or shutters in the input beam path.

The invention provides for that the input beams deflected from the Risley prism pairs can be directed to the output beam path by means of additional, adjustable or non-adjustable deflecting devices, more particularly by means of deflector mirrors.

Preferably the deflecting devices are arranged with a constant alignment in the beam path. They merely serve the function of deflecting the input beam already optimally adjusted by the Risley prism pairs to the output beam path and thus providing for superimposing the input beams in the output beam. With this configuration, an adjustment of the deflecting devices is not provided for. Eligible for use as deflecting device are various elements, with partly reflecting mirrors being particularly suitable. But even dispersive elements such as prisms, for example, are suitable for superimposing the input beams.

Also conceivable, though less advantageous due to its complexity and set-up cost, is a solution in which one Risley prism pair per input beam path is combined with an adjustable deflector mirror in order to achieve the desired alignment of the input beam on the output beam path.

With advantage the output beam path comprises a beam position measuring system, preferably in connection with a position-sensitive detector (PSD) or a camera. A beam divider, for example, is positioned in the output beam path, said beam divider uncoupling a small part of the combined beam from the main beam path and steering it to the detector. The detector measures the shape and position of the beam so that the user receives a conclusive statement on the result of the adjustment of the Risley prism pairs. Inasmuch as the detector recognizes a deviation from the desired beam shape and/or beam position, the user can perform an adjustment. Since an input beam path of its own comprising one or a plurality of Risley prism pairs are assigned to each individual input beam, each beam can also be deflected in such a manner that the detector of the beam position measuring system detects different beam positions. For example, it would also be conceivable to create two output beam paths which appear as two maxima on the detector. The desired beam position can be stipulated via the measuring system and be readjusted by means of the Risley prism pairs in the input beam paths. A positioning of the detector in the output beam path is recommendable where all input beams have already been superimposed. But to obtain partial conclusive statements on the adjustment of individual input beam paths, it is also possible to provide detectors behind individual deflecting devices which are arranged in the direction of beam in the front in the output beam path.

It is of special advantage that the Risley prism pairs are movable by a motor and that the orientation of the Risley prism pairs is controllable depending on the actual beam superimposition measured by means of the beam position measuring system in the output beam path and on the desired design beam superimposition. It is furthermore recommendable that the Risley prism pairs are movable in a computer-controlled manner. Thus the adjustment can be accomplished in a completely automated control manner so that the user need not take any manual action. The user merely stipulates the desired parameters of the beam position for the beam position measuring system. Via an algorithm, the measuring system controls the motors of the Risley prism pairs for as long as required until the real actual beam superimposition coincides with the desired beam superimposition.

In a particularly simple configuration of the inventive beam combining device, a power measuring system which measures the light power in the output beam can be utilized instead of the beam position measuring system. A suitable algorithm can be utilized in this case for controlling the motors of the Risley prism pairs in such a manner that the measured output power assumes a design value or a maximal value.

With some advantage, the Risley prism pairs of the input beam paths are movable independently of each other. In this manner the individual input beams as mentioned before can be manipulated independently of each other. A malposition of each input beam can be compensated individually.

Preferably the beam combining device is so configured that the input beams can be coupled by the aid of optical fibers into the input beam paths. Likewise, the output beam propagating in the output beam path can preferably be coupled into an optical fiber.

In accordance with a preferred embodiment of the invention, the Risley prism pairs are adjustable by means of particularly cost-effective vibrating piezo-actuators. By way of the piezo-vibration, the prisms of the Risley prism pairs are rotated in conformity with a more or less accidental scheme other than for example when using stepper motors. The desired beam position is set by starting or interrupting the vibration depending on the measured beam position until the design status is achieved.

Finally it is provided for that the beam combining device is arranged in a casing which on the input side comprises fiber plugs for coupling of optical fibers with the input beam paths and which on the output side comprises one or a plurality of fiber plugs for coupling the output beam path with one or a plurality of optical fibers. In this case, the user merely has to connect the radiation sources to be superimposed by way of an optical fiber with the fiber plug of the casing and on the output side of the casing to plug an optical fiber on the plug. On the output side of the casing, even several output fibers instead of one output fiber may be provided for so that the combined output beam is distributed to several receiver fibers. Likewise, the output beam can leave the casing as a free beam.

The invention furthermore relates to a device for deflecting a light beam comprising at least one Risley prism pair that comprises two prisms arranged one behind the other in the light beam course, with at least one of the two prisms being mounted in a manner rotatable about a rotation axis, and comprising an electric motor drive actuating a rotary movement of the at least one prism.

As mentioned hereinabove, it is actually known using a Risley prism pair for deflecting of light beams. The Risley prism pair is comprised of two prisms arranged one behind the other in the light beam course, wherein said prisms can be rotated individually or also jointly about a common rotation axis. If the two prisms are rotated against each other, the amount of the angle of the beam deflection changes relative to the optical axis running in parallel to the rotation axis. If both prisms are rotated jointly, the direction of the beam deflection (the (der Azimuth) changes. Risley prism pairs lend themselves suitable wherever a light beam is to be deflectable in a controlled manner, for example to couple it into an optical fiber.

Printed publication WO 01/57568 A1 describes an optical M×N switch in which one signal each is transmitted from an input fiber of a fiber array to an output fiber of a fiber array. A Risley prism pair arranged between the fiber array is so rotated in a computer-controlled manner that the light is steered to the desired output fiber. Utilized for rotation of the two Risley prisms are stepper motors which control the two prisms of the Risley prism pair via a microprocessor so that they approach the desired position with a fixed increment.

The fixed increment of the known stepper motor drive bears a disadvantage in that not any arbitrary deflection angle can be approached. Furthermore it bears the disadvantage that the fixed increment of the stepper motor drive can be reduced by a gear in order to enhance the angle resolution. But a sufficiently precise mechanical gear is very complex and represents a substantial structural magnitude.

The invention proposes a piezoelectric vibration drive serving as drive for rotating the prism, said drive comprising a mechanical resonator and a piezoelectric element coupled thereto, with the resonator bearing against a friction wheel connected to the at least one rotatably mounted prism for conjoint rotation.

When applying a suitable electric alternating voltage, the piezoelectric element (e.g. comprised of piezoactive thin-film ceramics) of the piezoelectric vibration drive executes mechanical oscillations and transmits these to the resonator which thereby is excited to resonances. The resonator bears against the rotatably mounted friction wheel. The resonator converts the oscillations of the piezoelectric element into oscillations of the resonator tip, i.e. the contact area of the resonator with the friction wheel. These oscillations cause a rotation of the friction wheel at which the resonator tip bears against.

With particularly low energy consumption and a particularly cost-effective production according to the invention, the piezoelectric vibration drive executes the desired rotation of the prism extremely exactly, that means with a quasi-analogous precision concerning the adjustable rotation angle. With each oscillation of the resonator tip, the friction wheel is moved on by an increment amounting to a few µm in circumferential direction, with the magnitude of the increment not being constant but statistically slightly varying. Therefore, any rotation angle—in conjunction with a suitable control—can in principle be approached with highest precision, e.g. by rotating the prism to and fro (in opposite rotation directions) until the desired angle is achieved. The time needed for this purpose is irrelevant for the majority of applications. In absolute terms, it lies within a range of milliseconds, because the drive can execute approx. 80,000-100,000 steps per second. The accuracy of the inventive deflection device thus only depends on the control system applied (including the pertinent sensor technology) and on the actuation time available.

The inventively applied vibration drive generates torques in a range of milli-newton-meters so that a gear can be dispensed with. Consequently this reduces the necessary structural size of the drive and increases its precision.

Since the resonator bears against the friction wheel connected to the prism for conjoint rotation, a rotation of the friction wheel is firmly and directly coupled to a corresponding rotation of the prism. Another advantage of the inventive drive results from the fact that the resonator retains the friction wheel which it bears against, and thus it holds the prism tight when the drive is not activated. Hence the prism is automatically arrested free from backlash after a once performed adjustment when the vibration drive has been deactivated.

Advantageously the deflecting device is so configured that the resonator amplifies an oscillation of the piezoelectric element and converts it into an at least two-dimensional oscillatory movement of the contact area of the resonator against the friction wheel. The mechanical oscillation modes of the resonator on the one hand result from the position and restraint of the piezoelectric element in or at the resonator, and on the other hand from the shape and mass of the resonator. What matters for the drive are the oscillations of the contact area of the resonator against the friction wheel, i.e. the resonator tip. It is of special advantage for the drive function if the resonator tip executes an ellipsoid movement, i.e. an oscillatory movement in two dimensions.

The invention provides for that the resonator preferably has at least two different resonance frequencies, with the rotation direction of the rotation movement being dependent on at which of the at least two different resonance frequencies the resonator is excited. The movement of the resonator tip is so different with the various resonance frequencies that opposite rotation directions of the friction wheel and thus of the prism are caused.

With particular advantage, the resonator is connected to a spring element that presses the resonator against the friction wheel. By means of the spring element, the resonator is pressed with a nearly constant force against the friction wheel in order to cause the drive of the friction wheel. On account of the spring force, the friction wheel and thus the prism cannot rotate automatically. A so called backlash does not exist with the inventive drive. This is of particular importance because the position of the prism is to be changed only occasionally since a permanent operation of the drive would destabilize the optical system as a whole.

In a preferred embodiment, the spring element is a leg spring simultaneously retaining the resonator. Hereby, and in a particularly simple manner, a retention and storage of the resonator is created on the one hand, and on the other hand the leg spring is extremely easy to mount at its free end in a device casing.

The deflecting device is advantageously so configured that the friction wheel is rotatably mounted by means of an anti-friction bearing, with the at least one prism being held in the area of a central through borehole of the friction wheel. This configuration is especially space-saving, since the prism can be arranged within the rotatable components, which means within the friction wheel. Likewise, the rotation axis of the anti-friction bearing and the rotation axis of the prism can thereby be laid one above the other in a highly simple and precise manner. At the same time, the prism in the area of the central through borehole of the friction wheel and also within a rotatable shaft connecting the friction wheel with the bearing can be protected from dust and dirt.

For adjustment of both prisms of the Risley prism pair it is recommendable that both prisms of the at least one Risley prism pair are mounted in a manner rotatable about a joint rotation axis, with each of the two prisms being connected to a friction wheel for conjoint rotation and with a piezoelectric vibration drive, each comprising a mechanical resonator bearing against the friction wheel and comprising a piezoelectric element coupled to the resonator, being assigned to each of the two prisms so that the two prisms are rotatable independently of each other. Owing to the independent drives of the prisms, it is thus possible to achieve an opposed rotation of the two prisms as well as a joint movement.

The fields of application of the inventive deflecting device are extremely diverse. In particular, a coupler comprising at least one light input and at least on light output can thereby be realized which is characterized in that the coupler for steering a light beam from the at least one light input to the at least one light output is comprised of at least one deflecting device having the features described hereinabove. By the aid of the coupler configured in this manner, the light beam can be steered without any manual adjustment expenditure from the light input to the light output. Likewise, couplers with several light inputs and several light outputs or also with several light inputs and several light outputs are feasible.

The inventive coupler can be so configured that the at least one light input is connected to a light source. The light source advantageously is a laser, more particularly a diode laser or a fiber laser. For example, the input beam can be fed via an optical fiber and a fiber plug mounted at the coupler casing to the coupler. The at least one light output itself can be connected to a light-conducting fiber. Hereby a fiber-optical array (fiber coupler) can be realized in a particularly simple manner in which the light beam is coupled via the light output directly into the light-conducting fiber. Light input and light output of the coupler are only connected to each other via the inventively driven Risley prism pair array.

The inventive rotation drive for the Risley prisms is especially suitable for controlling the beam deflection in a beam combining device of the kind described hereinabove.

Figure 2:
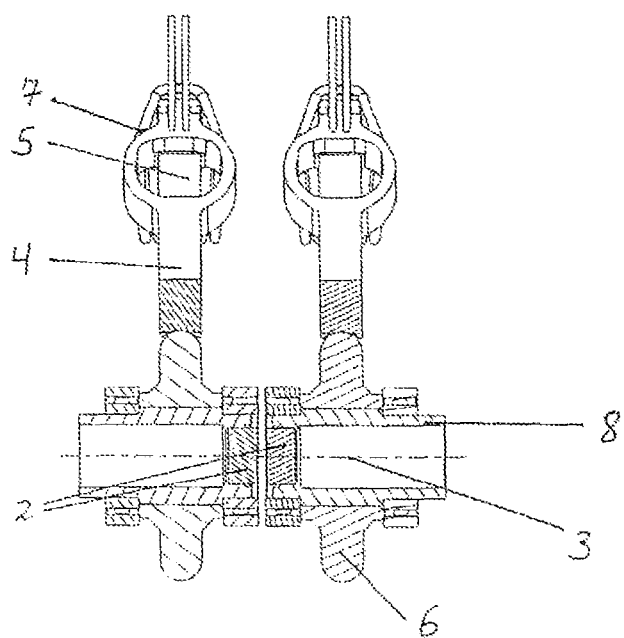
Figure 3:
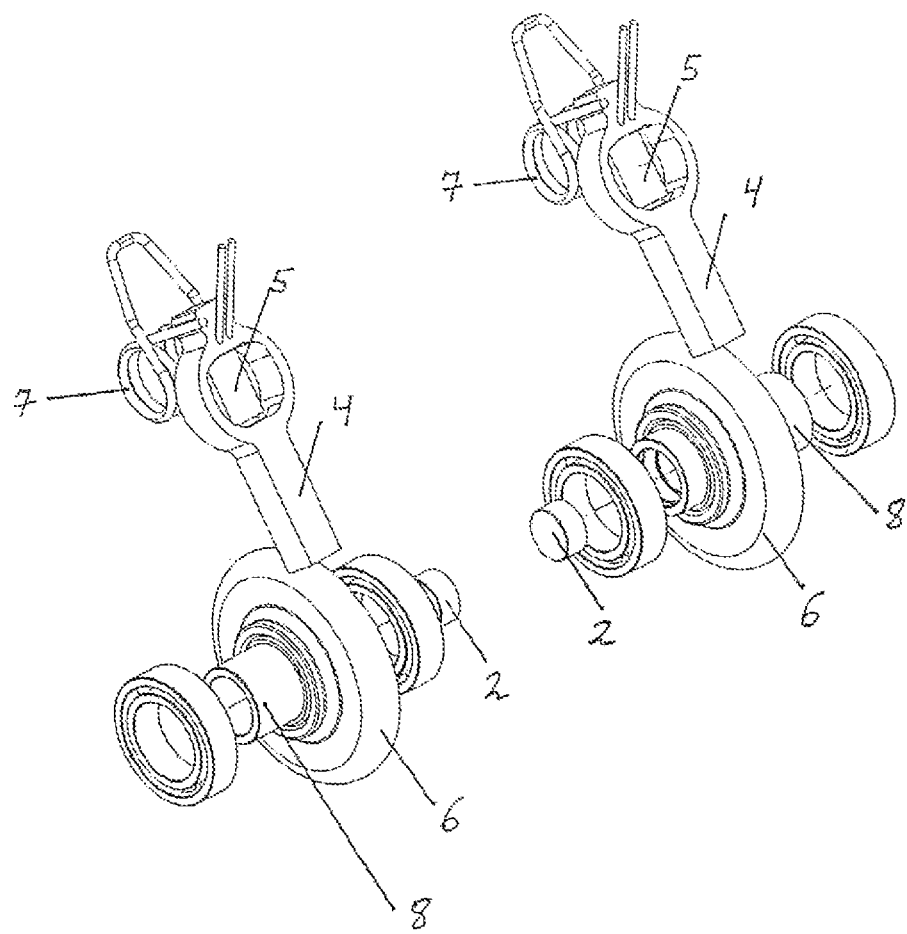
Figure 4:
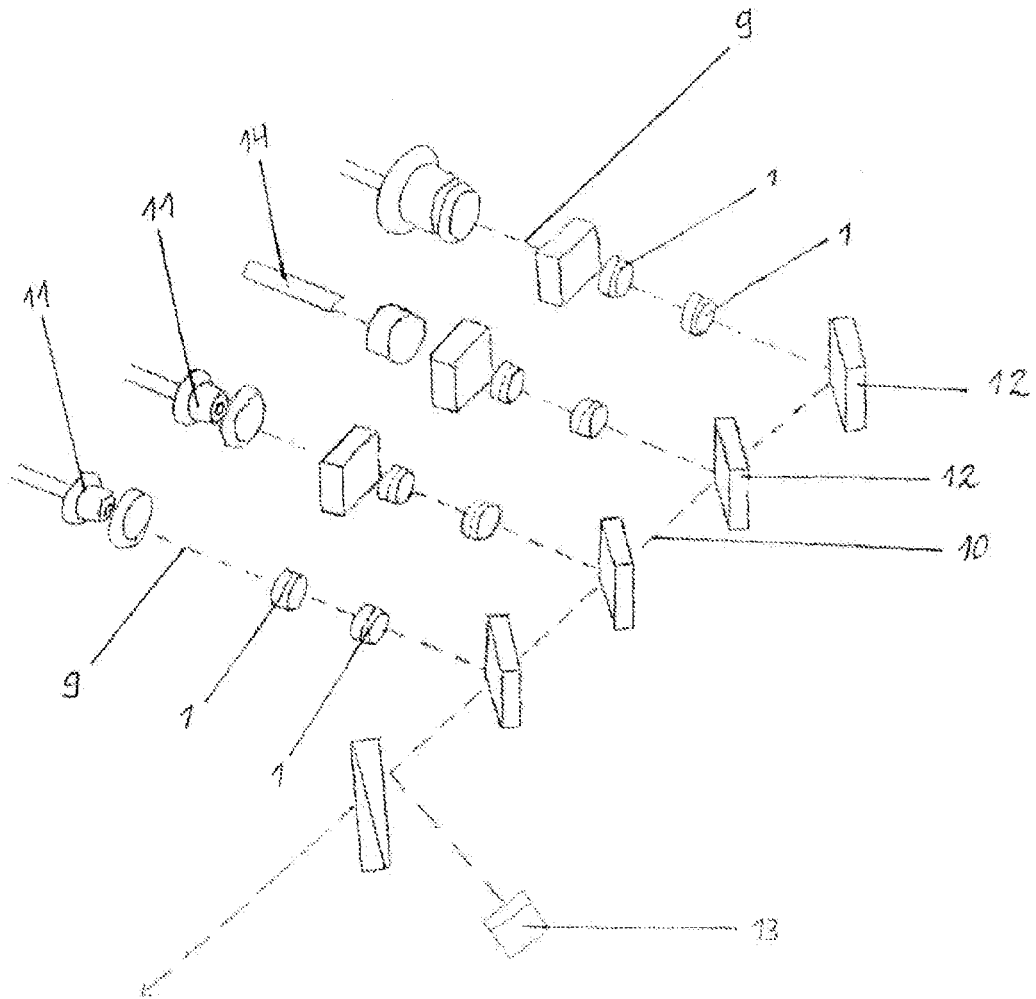

Practical examples of the invention are elucidated more closely based on the figures in the following, where:

FIG. 1: shows a 3D-view of an inventive deflecting device;

FIG. 2: shows a section of the deflecting device in the plane of the rotation axis of a Risley prism pair;

FIG. 3: is an exploded view of a deflecting device according to FIG. 1;

FIG. 4: shows a beam combining device with a beam deflection by Risley prism pairs.

The deflecting device illustrated in FIGS. 1 to 3 comprises a Risley prism pair which is comprised of two Risley prisms 2. The Risley prisms 2 are so arranged towards each other that they have a joint rotation axis 3 which coincides with the optical axis. A resonator 4 with a piezoelectric element 5 coupled thereto acts upon a friction wheel 6 connected to the prism 2 for conjoint rotation. The resonator 4 is retained via a spring element (leg spring) 7. The spring element presses the tip of the resonator 4 against the friction wheel 6. The friction wheel 6 is arranged on a hollow shaft 8 which is supported by means of anti-friction bearings (ball bearings). The prisms 2 are situated in a central through borehole of the hollow shaft 8 and/or in the area of the central through borehole of friction wheel 6 and thus they are connected to friction wheel 6 for conjoint rotation. In the arrangement with two drives shown here, the Risley prisms 2 are rotatable independently of each other.

FIG. 4 shows the inventive beam combining device which comprises a plurality of input beam paths 9 and a common output beam path 10. Arranged in the input beam paths 9 are two Risley prism pairs 1 each as well as a deflector mirror 12 which reproduces the relevant input beam path 9 on the output beam path 10. In the output beam path 10, after the deflector mirror 12, there is a beam divider which reproduces part of the light of the output beam path 10 on a measuring system 13 with a camera. Arranged on the input side of the beam combining device are laser diodes 11 and an optical fiber 14 as beam sources. The beam sources are comprised of collimators as well as optionally of additional built-on attachments such as shutters or filters.

The deflecting device according to FIGS. 1 to 3 works in such a manner that the piezoelectric element 5 is excited with alternating voltage of a certain frequency. Due to the high-frequency alternating voltage, the piezoelectric element 5 executes a vibration movement and transfers it to the mechanical resonator 4. Owing to the slightly inclined arrangement of the piezoelectric element 5 within the recess of resonator 4, the resonator tip executes an elliptic movement. Since the resonator 4 bears against the friction wheel 6, the friction wheel 6 is rotated by a certain angle on each vibration oscillation of resonator 4. The spring element 7 which is configured as a leg spring presses the resonator 4 with an essentially constant force against friction wheel 6 so that it is fixed in its position when the drive is out of operation. On each movement of friction wheel 6, the prism 2 situated in the area of the central through borehole of friction wheel 6 is moved at the same time. As shown in the exploded view of FIG. 3, two separate deflecting devices being independent of each other are connected to each other via the common rotation axis 3 of prisms 2 and/or friction wheels 6. Thus the two prisms 2 have a common optical axis, but can be rotated each separately via the friction wheel 6 and resonator 4 each assigned to them.

The beam combining device according to FIG. 4 works in such a manner that the diodes 11 and the optical fiber 14 are arranged upstream to the input beam paths 9. The input beam paths 9 are mainly formed by the optical axes which connect the Risley prism pairs 1 and the deflector mirror 12 to each other. To widen the radiation cross-sections of the diodes 11 and of the optical fiber 14, collimators are set in front of the exit the radiation sources 11, 14. In case that the radiation from a source 11, 14 is still to be filtered or to be restricted in its diameter, filters or shutters are set as attachments between radiation source 11, 14 and Risley prism pair 1 at the outset of input beam path 9. The input beams thus preformed enter into the relevant input beam path 9 assigned to them where they hit on the first Risley prism pair 1. The Risley prisms 2 of Risley prism pair 1 are rotated by the aid of the deflecting device shown in FIGS. 1 to 3 in accordance with the rotation position of friction wheel 6. The input beams are thereby deflected and hit on the second Risley prism pair 1. The light beams are again subjected to a deflection by the second Risley prism pair 1. Afterwards, the radiation from input beam paths 9 thus manipulated hits on deflector mirror 12 by which it is deflected into the output beam path 10. The deflector mirror 12 applied in this case is a 90° deflector mirror. Along the output beam path 10, the radiation portions of the individual input beam paths 9 are coupled by further 90° deflector mirrors 12 into the output beam path 10. Subsequently the entire radiation existing in output beam path 10 hits as output beam on a beam divider. It reflects a small part of the output beam on the camera of measuring system 13 and transmits the residual beam in the direction of a receiver, e.g. an optical fiber. The partial beam which is reflected on the camera generates a position-dependent intensity there which permits drawing conclusions on the quality of the beam combining. Now, if there is a difference between the design beam superimposition and the measured actual beam superimposition, the Risley prisms 2 of Risley prism pairs 1 are again readjusted until the desired design beam superimposition is measured by measuring system 13. This purpose is served by a (not shown) control unit that processes the signals of measuring system 13 and actuates the drives of the Risley prism pair 1 by means of a suitable algorithm.

The invention claimed is:

1. Beam combining device comprising a plurality of separate input beam paths and at least one output beam path for combining a plurality of input beams to form at least one output beam,
   wherein one or a plurality of Risley prism pairs are assigned to each input beam path, each Risley prism pair deflecting the input beam in an adjustable direction,
   wherein a beam position measuring system, preferably in conjunction with a position-sensitive detector or a camera, is arranged in the output beam path,
   wherein a power measuring system is arranged in the output beam path and measures the light power of the output beam,
   wherein each Risley prism pair comprises two prisms arranged one behind the other in the course of the light beam, with at least a first prism of the two prisms being mounted rotatably about a rotation axis,
   wherein said beam combining device further comprises an electric motor drive actuating a rotary movement of at least the first prism of the two prisms,
   wherein the electric motor drive is a piezoelectric vibration drive comprising a mechanical resonator and a piezoelectric element coupled thereto,
   wherein the mechanical resonator bears against a friction wheel connected to the first prism for conjoint rotation, and
   wherein the orientation of each Risley prism pair is controllable depending on the beam superimposition measured by the beam position measuring system or depending on the light power measured by the power measuring system.

2. Beam combining device according to claim 1, wherein the input beams deflected by the Risley prism pairs can be directed via additional, adjustable or non-adjustable deflecting devices, more particularly by deflector mirrors, to the output beam path.

3. Beam combining device according to claim 1, wherein the Risley prism pairs are moveable in a computer-controlled manner.

4. Beam combining device according to claim 1, wherein the Risley prism pairs of the input beam paths are moveable independently of each other.

5. Beam combining device according to claim 1, wherein the input beams can be coupled by the aid of optical fibers into the input beam paths.

6. Beam combining device according to claim 1, wherein the output beam propagating in the output beam path can be coupled into an optical fiber.

7. Beam combining device according to claim 1, wherein the plurality of separate input beam paths, the at least one output beam path, and the one or the plurality of Risley prism pairs are arranged in a casing which on the input side is comprised of fiber plugs for the coupling of optical fibers with the input beam paths and which on the output side is comprised of one or a plurality of fiber plugs for the coupling of the output beam path with one or a plurality of optical fibers.

* * * * *